United States Patent
Wilson et al.

(10) Patent No.: US 9,641,805 B2
(45) Date of Patent: May 2, 2017

(54) PROVIDING A TELE-IMMERSIVE EXPERIENCE USING A MIRROR METAPHOR

(71) Applicant: Microsoft Technology Licensing, LLC, Redmond, WA (US)

(72) Inventors: Andrew D. Wilson, Seattle, WA (US); Zhengyou Zhang, Bellevue, WA (US); Philip A. Chou, Bellevue, WA (US); Neil S. Fishman, Bothell, WA (US); Donald M. Gillett, Bellevue, WA (US); Hrvoje Benko, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/073,928

(22) Filed: Mar. 18, 2016

(65) Prior Publication Data

US 2016/0205353 A1 Jul. 14, 2016

Related U.S. Application Data

(63) Continuation of application No. 13/772,252, filed on Feb. 20, 2013, now Pat. No. 9,325,943.

(51) Int. Cl.
*H04N 7/14* (2006.01)
*H04N 7/15* (2006.01)
(Continued)

(52) U.S. Cl.
CPC .......... *H04N 7/157* (2013.01); *G06F 3/011* (2013.01); *G06F 3/0304* (2013.01); *H04N 7/147* (2013.01); *G06F 2203/0381* (2013.01)

(58) Field of Classification Search
CPC .................................................. H04N 7/14
(Continued)

(56) References Cited

U.S. PATENT DOCUMENTS 7,634,533 B2 12/2009 Rudolph et al.
8,644,467 B2 2/2014 Catchpole
(Continued)

OTHER PUBLICATIONS

Agamanolis, et al., "Reflection of Presence: Toward more natural and responsive telecollaboration", retrieved at <<http://citeseerx.ist.psu.edu/viewdoc/summary?doi=10.1.1.52.7139>>, Proceeding of SPIE Multimedia Networks, vol. 3228, Nov. 1997, 9 pages.

(Continued)

*Primary Examiner* — Olisa Anwah
(74) *Attorney, Agent, or Firm* — Newport IP, LLC; Mike R. Cicero

(57) ABSTRACT

A tele-immersive environment is described that provides interaction among participants of a tele-immersive session. The environment includes two or more set-ups, each associated with a participant. Each set-up, in turn, includes mirror functionality for presenting a three-dimensional virtual space for viewing by a local participant. The virtual space shows at least some of the participants as if the participants were physically present at a same location and looking into a mirror. The mirror functionality can be implemented as a combination of a semi-transparent mirror and a display device, or just a display device acting alone. According to another feature, the environment may present a virtual object in a manner that allows any of the participants of the tele-immersive session to interact with the virtual object.

19 Claims, 9 Drawing Sheets

(51) Int. Cl.
*G06F 3/01* (2006.01)
*G06F 3/03* (2006.01)

(58) Field of Classification Search
USPC .......... 348/14.01, 14.02, 14.07, 14.08, 14.11
See application file for complete search history.

(56) References Cited

U.S. PATENT DOCUMENTS

| | | | |
|---|---|---|---|
| 9,030,522 B2* | 5/2015 | Hines | H04L 65/4076 348/14.07 |
| 9,049,033 B2* | 6/2015 | Lemmey | H04L 12/1827 |
| 2002/0158873 A1 | 10/2002 | Williamson | |
| 2005/0024484 A1 | 2/2005 | Leonard et al. | |
| 2007/0040033 A1 | 2/2007 | Rosenberg | |
| 2008/0012936 A1 | 1/2008 | White | |
| 2008/0235582 A1 | 9/2008 | Zalewski et al. | |
| 2009/0033737 A1 | 2/2009 | Goose et al. | |
| 2009/0221368 A1* | 9/2009 | Yen | A63F 13/10 463/32 |
| 2010/0225735 A1 | 9/2010 | Shaffer et al. | |
| 2010/0238265 A1 | 9/2010 | White | |
| 2010/0245535 A1 | 9/2010 | Mauchly | |
| 2010/0277576 A1 | 11/2010 | Fattal et al. | |
| 2011/0050842 A1 | 3/2011 | Saleh et al. | |
| 2011/0096136 A1 | 4/2011 | Liu et al. | |
| 2011/0102320 A1 | 5/2011 | Hauke et al. | |
| 2011/0102539 A1 | 5/2011 | Ferren | |
| 2011/0107216 A1 | 5/2011 | Bi | |
| 2011/0202603 A1 | 8/2011 | Mate et al. | |
| 2011/0219307 A1 | 9/2011 | Mate et al. | |
| 2011/0276922 A1 | 11/2011 | Boyd et al. | |
| 2012/0038742 A1 | 2/2012 | Robinson et al. | |
| 2012/0050458 A1 | 3/2012 | Mauchly et al. | |
| 2012/0162384 A1 | 6/2012 | Vesely et al. | |
| 2012/0281059 A1 | 11/2012 | Chou et al. | |
| 2012/0293487 A1 | 11/2012 | Betzler et al. | |
| 2012/0307005 A1 | 12/2012 | Guzman Suarez et al. | |
| 2012/0317501 A1 | 12/2012 | Milou | |
| 2013/0050398 A1 | 2/2013 | Krans et al. | |
| 2013/0063560 A1* | 3/2013 | Roberts | G06F 3/011 348/46 |
| 2013/0162749 A1 | 6/2013 | Eskilsson | |
| 2013/0201276 A1 | 8/2013 | Pradeep et al. | |
| 2014/0026064 A1 | 1/2014 | Dawson et al. | |
| 2014/0026077 A1 | 1/2014 | Dawson et al. | |
| 2014/0026078 A1 | 1/2014 | Dawson et al. | |
| 2014/0176684 A1 | 6/2014 | Varela et al. | |
| 2014/0232816 A1 | 8/2014 | Wilson et al. | |

OTHER PUBLICATIONS

Bishop, Todd, "Microsoft shows off 'Holoflector' augmented-reality mirror", NBC News, retrieved at <<http://www.nbcnews.com/technology/futureoftech/microsoft-shows-holoflector -augmented-reality-mirror -244009>>, Feb. 27, 2012, 4 pages.

Butz, et al., "An Experimental Hybrid User Interface for Collaboration", retrieved at <<http://www.cs.ucsb.edu/ holl/pubs/butz-1999-cucstr.pdf>>,Technical Report No. CUCS-005-99, Columbia University, 1999, 19 pages.

Defanti, et al., "Teleimmersion", retrieved at <<http://www.elsevierdirect. com/companions/9781558609334/appendices/Chapter_06.pdf>>, retrieved on Dec. 31, 2012, Chapter 6 in The Grid: Blueprint for a New Computing Infrastructure, Eds. Foster, et al., Morgan Kaufmann publishers, 1999, 26 pages.

Hasoya, et al., "A Mirror Metaphor Interaction System: Touching Remote Real Objects in an Augmented Reality Environment", retrieved at <<http://ieeexplore.ieee.org/stamp/stamp.Jsp?tp=&arnumber=1240755>>, Proceedings of the Second IEEE and ACM International Symposium on Mixed and Augmented Reality (ISMAR t03), Oct. 7, 2003, 2 pages.

Ishii, et al., "ClearBoard: A Seamless Medium for Shared Drawing and Conversation with Eye Contact", retrieved at <<httpf/:acm.org>>, Proceedings of the SIGCHI Conference on Human Factors in Computing Systems, 1992, 10 pages.

Ishii, et al., "Integration of Interpersonal Space and Shared Sorkspace: ClearBoard Design and Experiments", In ACM Transactions on Information Systems, vol. 11, Issue 4, Oct. 1993, pp. 349-375.

Morikawa, et al., "HyperMirror: Toward Pleasant-to-use Video Mediated Communication System", In Proceedings of the 1998 ACM Conference on Computer Supported Cooperative Work, 1998, pp. 149-158.

Office action for U.S. Appl. 13/772,252, mailed on Feb. 20, 2015, Wilson et al., "Providing a Tele-Immersive Experience Using a Mirror Metaphor", 17 pages.

Office action for U.S. Appl. 13/772,252, mailed on Jun. 17, 2015, Wilson et al., "Providing a Tele-Immersive Experience Using a Mirror Metaphor", 11 pages.

PCT Search and Written Opinion in PCT/US2014/016653, mailing date Jun. 25, 2014, 11 pages.

Petit, et al., "Multicamera Real-Time 3DModeling for Telepresence and Remote Collaboration", retrieved at <<http://www.hindawi.com/journals/ijdmb/201 0/247108/>>, International Journal of Digital Multimedia Broadcasting, vol. 2010, May 2009, 12 pages.

Raskar, et al., "The Office of the Future: A Unified Approach to Image-based Modeling and Spatially Immersive Displays", retrieved at <<http:/facm.org>>, Proceedings of the 25th Annual Conference on Computer Graphics and Interactive Techniques, 1998, 10 pages.

Sato, et al., "MR-Mirror: A Complex of Real and Virtual Mirrors", In Virtual and Mixed Reality, Lecture Notes in Computer Science, Springer Berlin Heidelberg, vol. 5622, 2009, pp. 482-491.

Sheppard, et al., "Advancing Interactive Collaborative Mediums through Tele-Immersive Dance TED: a Symbiotic Creativity and Design Environment for Art and Computer Science", retrieved at <<http://cairo.cs.uiuc.edu/projects/teleimmersion/files/sheppard08 mm.pdf>>, Proceedings of the 16th ACM international Conference on Multimedia, 2008, 11 pages.

Tan, et al., "ConnectBoard: Enabling Genuine Eye Contact and Accurate Gaze in Remote Collaboration", retrieved at <<http:/fwww.hpl.hp.com/techreports/2011/HPL-2011-83.pdf>>, HP Laboratories Technical Report No. HPL-2011-83, 2011, Hewlett-Packard Company, Palo Alto, California, 9 pages.

Wu, et al., "Towards Multi-Site Collaboration in 3D Tele-Immersive Environments", retrieved at <<http://ieeexplore.ieee.org/stamp/stamp.jsp?tp=&arnumber=4595938>>, Proceedings of the 28th International Conference on Distributed Computing Systems, ICDCS '08, Jun. 2008, 647-654.

Yang, et al., "A Multi-stream Adaptation Framework for Bandwidth Management in 3D Tele-immersion", retrieved at <<http://acm.org>>, Proceedings of the 2006 International Workshop on Network and Operating Systems Support for Digital Audio and Video, Article No. 14, 2006, 6 pages.

Zhang, et al., "Viewport: A Fully Distributed Immersive Teleconferencing System with Infrared Dot Pattern", retrieved at <<http:/fresearch.microsoft.com/pubs/167075/msr_tr_2012-60.pdf>>, Microsoft Research Technical Report No. MSR-TR-2012-60, Microsoft Corporation, Redmond, Washington, Oct. 2012, 11 pages.

"International Preliminary Report on Patentability Issued in PCT Application No. PCT/US2014/016653", Mailed Date: May 26, 2015, 8 Pages.

"Second Written Opinion Issued in PCT Application No. PCT/US2014/016653", Mailed Date: Jan. 20, 2015, 7 Pages.

"Non Final Office Action Issued in U.S. Appl. No. 13/772,252", Mailed Date: Sep. 2, 2014, 15 pages.

"Notice of Allowance Issued in U.S. Appl. No. 13/772,252", Mailed Date: Feb. 1, 2016, 8 Pages.

* cited by examiner

PROVIDING A TELE-IMMERSIVE EXPERIENCE USING A MIRROR METAPHOR

CROSS-REFERENCE TO RELATED APPLICATIONS

This application is a continuation of U.S. patent application Ser. No. 13/772,252, filed on Feb. 20, 2013 of which is incorporated by reference herein in its entirety.

BACKGROUND

A tele-immersive collaboration system enables real-time interaction among two or more participants who are geographically separated from each other. This kind of system differs from a conventional video conferencing system by giving each participant the impression that he or she is working in the same physical space as the other remote participants.

One tele-immersive collaboration system provides a shared-space experience using a window metaphor. That is, this type of system gives a first participant the impression that he or she is looking through a transparent window at a second participant, who is located on the opposite side of the window. But this type of collaboration system may have one or more drawbacks. First, this system is not well suited for more than two participants because the window metaphor presupposes only two positions, corresponding to the front and back of a window pane. Second, this system does not readily accommodate a shared workspace in which participants can manipulate virtual objects, that is, without deviating from the principles of the window metaphor to some extent. Third, this system does not provide a suitable mechanism by which each local participant can monitor the manner in which he or she appears to the remote participants. Some video conferencing systems achieve this result by including a small picture in the peripheral region of a display that shows the image of the local participant that is presented to other participants; but this kind of picture may be regarded as distracting and unnatural by the local participant.

The above-noted potential drawbacks are cited by way of example, not limitation.

SUMMARY

A tele-immersive environment is described herein that includes two or more set-ups. A local participant corresponds to a participant who is physically present at a particular local set-up; a remote participant corresponds to a participant who is physically present at a set-up that is remote with respect to the local set-up. Each set-up, in turn, includes mirror functionality for producing a three-dimensional virtual space for viewing by a local participant. That virtual space shows at least some of the participants as if the participants were physically present at a same location and looking into a mirror.

In one illustrative implementation, the mirror functionality provided by each set-up includes a physical semi-transparent mirror placed in front of a display device. The semi-transparent mirror presents a virtual image of the local participant, while the display device presents a virtual image of the remote participant(s).

In another illustrative implementation, the mirror functionality includes a display device that simulates a physical mirror. That is, the display device in this embodiment presents a virtual image of both the local participant and the remote participant(s), without the use of a physical semi-transparent mirror.

According to another illustrative aspect, each set-up includes functionality for constructing a depth image of its local participant.

According to another illustrative aspect, each set-up includes a physical workspace in which the local participant may place a physical object. The set-up produces a virtual object which is the counterpart of the physical object. In one implementation, the physical workspace includes a workspace table on which the local participant may place physical objects.

According to another illustrative aspect, the mirror functionality at each set-up provides functionality that allows participants to jointly manipulate a virtual object. The virtual object may or may not have a counterpart physical object in the workspace of one of the set-ups.

According to another illustrative aspect, the virtual space produced by the environment includes a virtual-reflected space and a virtual-actual space. The virtual-reflected space includes one or more virtual-reflected objects that are projected from a perspective of reflections on a mirror surface. The virtual-actual space includes one or more virtual-actual objects that are projected from a perspective of entities that are placed before the mirror surface.

The above approach can be manifested in various types of systems, components, methods, computer readable storage media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A provides an overview of a tele-immersive environment that uses a mirror metaphor; more specifically, this Section emphasizes the experience provided to the participants of a tele-immersive session. Section B describes illustrative implementations of the environment introduced in Section A. Section C sets forth illustrative variations and extensions of the concepts and functionality described in Sections A and B. Section D sets forth an illustrative method which explains the operation of the functionality of Sections A-C. And Section E describes illustrative computing functionality that can be used to implement any aspect of the features described in Sections A-D.

Figure 10:
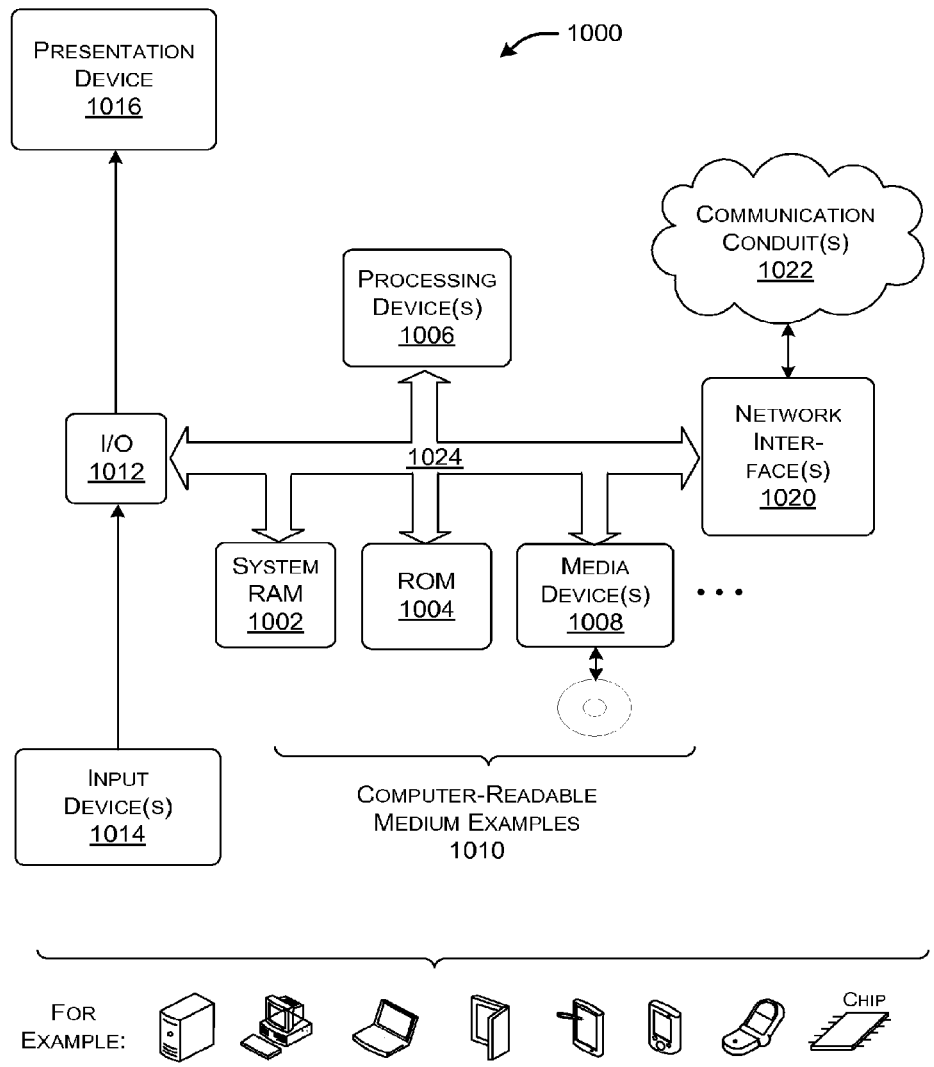
FIG. 10 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 10, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/or any combination thereof. When implemented by a computing system, a logic component represents an electrical component that is a physical part of the computing system, however implemented.

The phrase "means for" in the claims, if used, is intended to invoke the provisions of 35 U.S.C. §112, sixth paragraph. No other language, other than this specific phrase, is intended to invoke the provisions of that portion of the statute.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations A. Illustrative Participant Experience This section provides an overview of a tele-immersive environment that operates using a mirror metaphor. More specifically, this section introduces the tele-immersive environment by mainly describing the type of experience that it provides to each of its participants. Sections B-D (below) provide details regarding various ways that this experience can be implemented.

Figure 1:
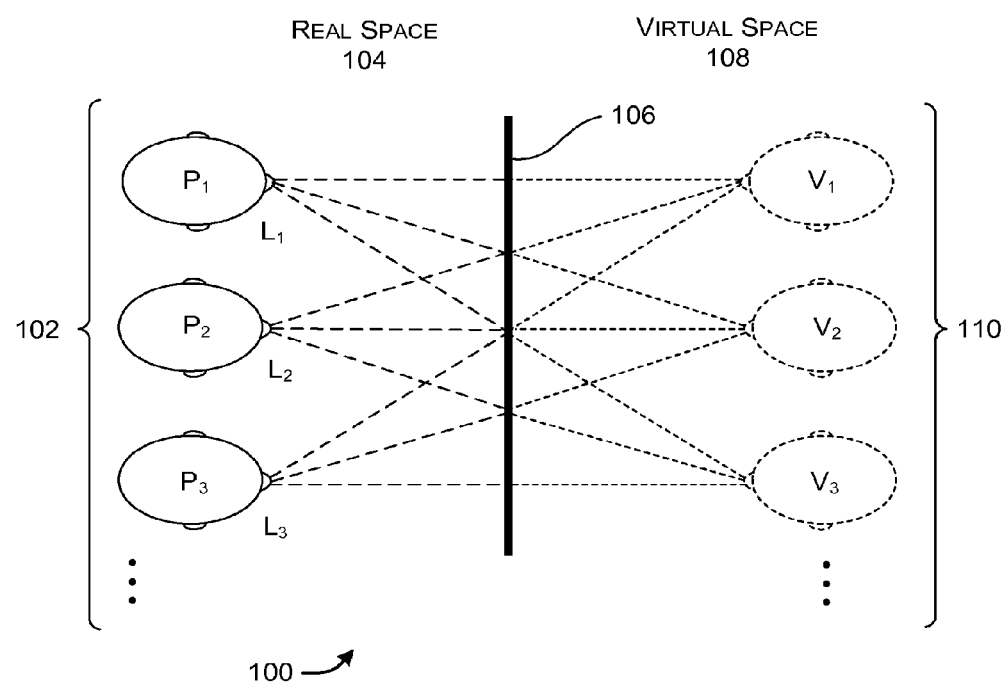
FIG. 1 shows an overview of a tele-immersive environment that uses a mirror metaphor.

Starting with FIG. 1, this figure shows an overview of a tele-immersive environment 100 that provides a tele-immersive experience to three participants, labeled as participant $P_1$, participant $P_2$, and participant $P_3$. However, the environment 100 can provide a tele-immersive session involving just two participants, or more than three participants. Each participant operates at a different geographical location compared to the other two participants. That is, participant $P_1$ operates at location $L_1$, participant $P_2$ operates at location $L_2$, and participant $P_3$ operates at location $L_3$, etc. When describing the environment 100 from the vantage point of any particular location, the participant at that location is referred to as a local participant, while the other participants are referred to as remote participants. Further, a local set-up refers to functionality provided at a particular site associated with the local participant. A remote set-up refers to functionality provided at a site associated with a remote participant.

Each location can be separated from any other location by any distance. For example, in one case, two participants may be relatively close together, as when the participants occupy different rooms of the same building or different buildings in a campus environment. In another case, two participants may be farther apart, as when the participants are located in different states, provinces, or countries, and so on. FIG. 1 simplifies the depiction of the three participants ($P_1$, $P_2$, $P_3$) by indicating that they all generally occupy a real space 104. A real space is a space that contains physical entities (e.g., people, physical objects, etc.).

The environment 100 uses mirror functionality 106 to present a three-dimensional virtual space 108. The virtual space 108 provides virtual images 110 of the participants 102 using a mirror metaphor. The mirror metaphor gives each participant the impression that all of the participants are present at the same physical location and looking into the same mirror, when, in fact, the participants are actually at different locations (e.g., locations $L_1$, $L_2$, $L_3$). That is, each participant will see virtual images $V_1$, $V_2$, and $V_3$ in the virtual space 108 produced by the mirror functionality 106. The virtual image $V_1$ is the virtual counterpart of the real participant $P_1$. The virtual image $V_2$ is the virtual counterpart of the real participant $P_2$. And the virtual image $V_3$ is the virtual counterpart of the real participant $P_3$. (However, as will be described below, each participant's view of the virtual space 108 can also differ in some respects from the views of the other participants; for instance, based on a configuration setting, a local participant can opt to omit his virtual image from the virtual space 108.)

FIG. 1 indicates that the environment 100 arranges the virtual images 110 to give the impression that the participant $P_2$ is situated in the middle of participants $P_1$ and $P_3$, e.g., with participant $P_1$ to the left of participant $P_2$, and participant $P_3$ to the right of participant $P_2$. But this manner of ordering the virtual images 110 can be changed. For example, the environment 100 can assign the order in an arbitrary manner, or can use any factor or factors to select the order. For instance, the environment 100 can assign the order based on order-related preferences of the participants. Or the environment 100 can assign the order based on the temporal order in which each participant joined the session, and so on. Further, the environment 100 can dynamically change the order of the participants during the tele-immersive session based on any triggering factor(s).

In the example of FIG. 1, the virtual images ($V_1$, $V_2$, and $V_3$) correspond to reflected images on a metaphorical mirror surface. These virtual images may therefore be referred to as virtual-reflected objects, and the virtual space 108 as a whole can be referred to as a virtual-reflected space. Section D presents an example in which the virtual space 108 also includes virtual images associated with objects that are placed before the mirror surface, rather than reflections on the mirror surface. These virtual images may be referred to as virtual-actual objects, and the part of the virtual space that provides these objects can be referred to as virtual-actual space. Each virtual-actual object has a virtual-reflection counterpart, and, in some cases, a real physical counterpart. But to simplify the explanation, the ensuing explanation will first assume that all virtual images correspond to reflections in the mirror surface, rather than representations of objects that are placed before the mirror surface.

Figure 2:
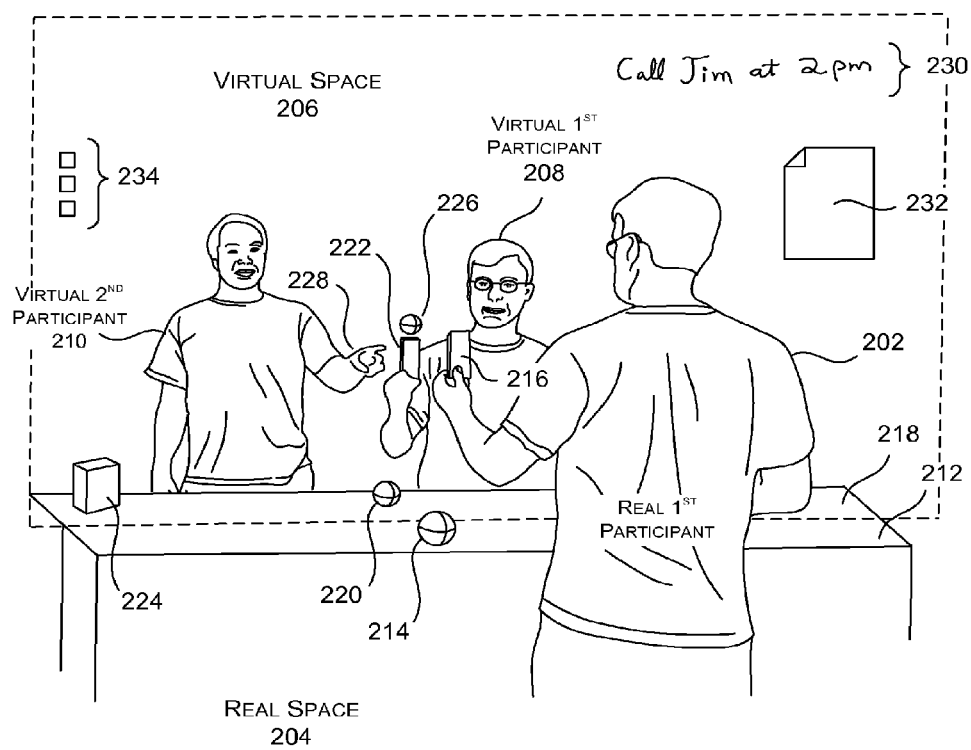
FIG. 2 depicts a tele-immersive experience that is provided to two participants using the kind of environment shown in FIG. 1.

FIG. 2 depicts a tele-immersive experience that the environment (of FIG. 1) provides to a local first participant 202. This tele-immersive session involves just two participants, although, as noted above, the session can involve more than two people. The other (remote) participant is referred to herein as the second participant.

More specifically, FIG. 2 depicts the experience of the first participant 202 from the perspective of first participant's local set-up. In that setting, the first participant 202 is standing in a real space 204 and looking at a virtual space 206 created by the environment 100. The virtual space 206 shows a virtual image 208 of the first participant 202 and a virtual image 210 of the second participant.

Although not shown, the second participant can be visualized as standing in a real space provided by his own local set-up. And like the first participant 202, the second participant can be visualized as looking at a virtual space created by the environment 100. That virtual space will include the virtual image 208 of the first participant 202, as well as the virtual image 210 of the second participant. In other words, in one configuration, the first participant 202 may see the same virtual space as the second participant.

In another configuration, the virtual space 206 seen by the first participant 202 may differ from the virtual space seen by the second participant in one or more respects. For example, as noted above, the first participant can opt to omit his own virtual image 208 from the virtual space 206; likewise, the second participant can opt to omit his own virtual image 210 from his virtual space. Note that this ability to omit one's own reflection is an option that may be available to varying extents depending on the manner in which an environment implements the mirror metaphor; for instance, the environment 400 of FIG. 4 (to be described below) accommodates this option more readily than the environment 300 of FIG. 3 (to be described below).

From a high-level perspective, the virtual space 206 gives the impression that the two participants are standing side by side in the same room. For example, the virtual space 206 creates the illusion that the second participant is standing to the immediate left of the first participant 202, from the perspective of the first participant 202, even though the second participant is physically present at an entirely different geographic location compared to the first participant 202. Also note that the virtual space 206 presents a flipped (i.e., mirror) version of the real space 204.

Further, the virtual image 208 of the first participant 202 has roughly the same size as the virtual image 210 of the second participant. But the environment 100 can alternatively display a reduced-size or an increased-size virtual image of any participant (relative to the sizes of the other participants). Alternatively, or in addition, the environment 100 can use any graphical effect to highlight any participant in the virtual space 206, such as by presenting a glowing aura around the participant who is speaking at a current time, or by displaying a graphical arrow that points to the participant who is speaking, and so on.

The environment 100 can also provide other features, some of which are enumerated below.

(a) Manipulation of Virtual Objects. FIG. 2 indicates that the real space 204 of the local set-up includes a workspace in which the first participant 202 may manipulate real objects. For instance, the first participant 202 has placed a real ball 214 on a physical table 212. The workspace may also encompass the space in which the first participant 202 may actively manipulate one or more objects, e.g., with his hands or any other body part(s). For example, the first participant 202 is holding a rectangular object 216 in his left hand; more specifically, the first participant 202 extends the rectangular object 216 out towards to the surface of the virtual space 206, as if to show it to the second participant. In one merely representative case, assume that the rectangular object 216 corresponds to a smart phone or some other handheld electronic device, although the rectangular object 216 can correspond to any physical object.

In a similar manner, the remote set-up in which the second participant operates includes a workspace in which the second participant may interact with physical objects. For example, the workspace may include a physical table that is the counterpart of the physical table 212 in the local set-up. As will be described below, the second participant has placed another rectangular object on his table.

The environment 100 also creates virtual objects that correspond to the physical objects. These virtual objects appear in each virtual space as virtual images. For example, the environment 100 creates a virtual table 218 which is a virtual counterpart of the physical table 212. The environment 100 creates a virtual ball 220 which is a virtual counterpart of the real ball 214. Note that the virtual ball 220 appears to sit on the virtual table 218 in the virtual space 206. The environment 100 also creates a virtual rectangular object 222 which is the virtual counterpart of the physical rectangular object 216. Note that the virtual image 208 of the first participant 202 depicts a person that is holding the virtual rectangular object 222. And finally, the environment 100 creates another virtual rectangular object 224 which also sits on the virtual table 218. This virtual rectangular object 224 is the virtual counterpart of a physical rectangular object (not shown) which the second participant places on his own physical table (not shown). The environment 100 can provide appropriate processing to ensure that the virtual space presented to any participant only includes one virtual table 218, e.g., so that the multiple physical tables in the different set-ups do not produce multiple overlapping virtual tables; to accommodate this feature, each set-up can include an identically-constructed and identically-placed physical table.

Each of the virtual objects described above mirrors a physical object that appears in the real spaces of the environment 100. For example, each virtual object on the virtual table 218 has a counterpart physical object on the physical table 212 of the first participant's set-up or the physical table of the second participant's set-up. The environment 100 can also produce virtual objects that have no physical counterparts in the real spaces defined by the environment 100. The virtual objects may be referred to as pure-virtual objects. For example, the environment 100 presents a virtual ball 226 that appears to sit on top of the virtual rectangular object 222. That virtual ball 226 has no physical counterpart in any of the real spaces.

In one implementation, the environment 100 includes a physics simulation engine that assigns physical properties to the virtual ball 226. The physics simulation engine can also model the movement of the virtual ball 226 as if it were a real physical ball, e.g., by making the movement of the virtual ball 226 subject to Newton's laws, etc. In one scenario, the first participant 202 can then move the physical rectangular object 216 in an effort to keep the virtual ball 226 balanced on top of the virtual rectangular object 222, much in the same way that the first participant 202 would move the rectangular object 216 to keep a physical ball balanced on top of the rectangular object 216. Again, this is merely a representative example; other implementations can present any type of pure-virtual objects, and can assign any realistic and/or fanciful dynamics to these virtual objects.

The participants can also jointly interact with any virtual object. For example, FIG. 2 shows that the second participant is pointing to the virtual rectangular object 222. For instance, the second participant may be making a comment regarding the virtual rectangular object 222. To help convey his meaning, the second participant may point to the precise part of the virtual rectangular object 222 that is he is talking about at a particular moment in time.

Any participant may also manipulate any virtual object. For example, in one scenario, the second participant may be permitted to reach out and grasp the virtual ball 226 that is being balanced by the first participant 202 atop the virtual rectangular object 222. The second participant can then exercise control over the virtual ball 226. The second participant can execute this operation by observing his virtual image 210 that appears in the virtual space. That is, the second participant can use the movement of his virtual image 210 as a guide to determine how he should move his real hand.

To perform the above-described kinds of manipulation, the environment 100 can use tracking functionality that tracks the positions of physical entities in the real spaces of the environment 100. For example, the environment 100 can track the movement of each participant's hands, and/or head, and/or eyes, and/or entire body. The environment 100 can also track the locations of non-animate objects that appear in the real spaces of the environment 100. These tracking operations produce tracking information. The environment 100 can use the tracking information to control virtual objects, e.g., by enabling the second participant's virtual hand 228 (having a first location in virtual space 206) to accurately grasp the virtual ball 226 (having a second location in virtual space 206).

In one particular scenario, a participant can also move any virtual object in a direction that is approximately orthogonal to the surface of the mirror functionality 106, e.g., by pulling or pushing the virtual object in that orthogonal direction. As will be described, the environment 100 can perform this operation because it models objects in the virtual space as three-dimensional entities having depth.

(b) Presentation of Content in the Virtual Space. The environment 100 can allow any participant to add a note to the "surface" of the mirror functionality 106. For example, the first participant 202 uses a stylus, finger, or some other tool to write a note 230 on the surface of the mirror functionality 106. The environment 100 can present this note 230 such that it flows in the correct direction from the vantage point of each participant, e.g., in the English language, from left to right. Any participant may then manipulate the note 230 in any manner, such as by editing the note 230, moving the location of the note 230 in the virtual space, resizing the note 230, erasing the note 230, archiving the note 230 in a data store, printing the note 230, and so on.

The environment 100 can also allow any participant to retrieve documents or other digital content for presentation in the virtual space. For example, the first participant 202 has retrieved a document 232 from an archive, and instructed the environment 100 to post it on the "mirror surface" of the mirror functionality 106. Once presented in the virtual space, any participant may then manipulate the document 232 in any manner, such as by navigating within the document 232, editing the document 232, adding highlights or comments to the document 232, moving the location of the document 232 within the virtual space, deleting the document 232, resizing the document 232, printing the document 232, and so on.

More generally, the environment 100 implements the above-described functionality using the metaphor of a shared workspace wall, where the mirror surface constitutes the wall. The participants interact with the wall as if they were standing in front of it, side by side. The participants may add writing to the wall, post documents to the wall, or change any other features of this surface. The information added to the virtual wall may be generically referred to as participant-specified information.

(c) Presentation of Control Features in the Virtual Space. The environment 100 can also display control features in a virtual space. For example, FIG. 2 shows an example in which the environment 100 presents a control feature 234 on the "mirror surface" of the mirror functionality 106. Each participant can interact with the control feature 234 to perform any application-specific function(s). For example, the control feature 234 may correspond to any kind of graphical control feature, such as one or more menus of any type, one or more buttons, one or more slide bars, one or more knobs, one or more check boxes or radio buttons, etc., or any combination thereof. A participant can manipulate these kinds of graphical features to control any aspect of the interactive experience. For example, a local participant can interact with a control feature to adjust the volume at which each remote participant's voice is presented to him or her.

The environment 100 described above has a number of potential benefits. According to one potential benefit, the environment 100 produces a shared virtual space that can accommodate any number of participants. In other words, the environment 100 scales well to any number of participants without departing from the underlying principle of its mirror metaphor.

According to another potential benefit, the environment 100 provides an easy-to-understand and easy-to-use framework for jointly manipulating virtual objects, without departing from the underlying principle of its mirror metaphor.

According to another potential benefit, the environment 100 provides a convenient and natural mechanism for showing a local participant how they likely appear to the remote participant(s). For example, in one configuration setting, the virtual space 206 that appears to the first participant 202 may look exactly the same as the virtual space that appears to the second participant. Hence, the first participant 202 can be reasonably assured that his appearance (as it appears in the virtual image 208) is the same or similar to his virtual image as it appears to the second participant.

According to another potential benefit, the environment 100 provides an easy-to-understand and easy-to-use technique for posting notes, documents, and other content to the "mirror surface" of the mirror functionality 106, e.g., using the shared wall metaphor described above.

The above potential benefits are cited by way of example, not limitation. Other implementations may offer additional benefits. Other implementations may also lack one or more of the features described above.

B. Illustrative Implementations

Figure 3:
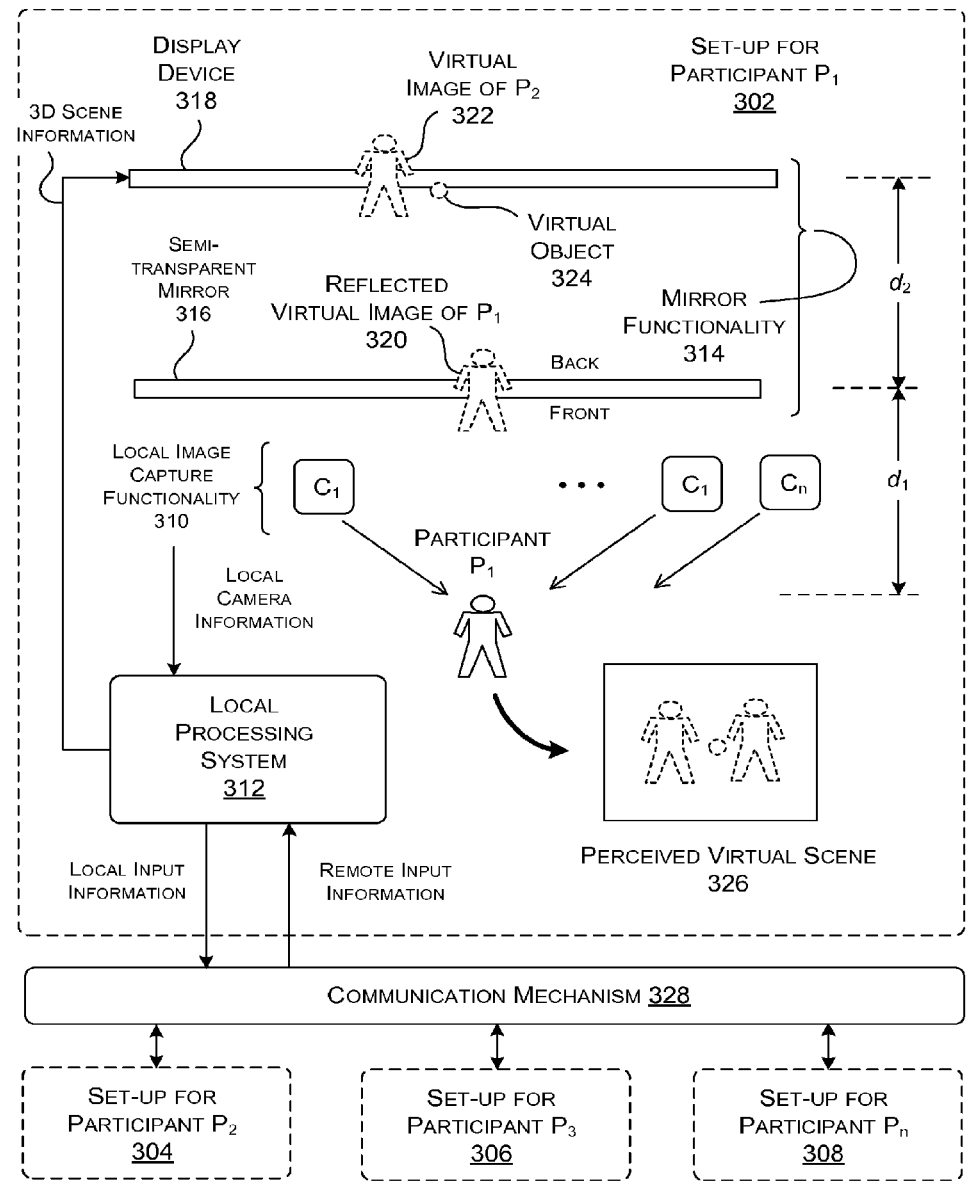
FIG. 3 shows a first implementation of an environment that may produce the experience illustrated in FIG. 2. This implementation provides mirror functionality that uses a physical semi-transparent mirror in conjunction with a display device, which is placed behind the mirror.

FIG. 3 shows an environment 300 that represents a first implementation of the features described above. The environment 300 generally provides a set of set-ups for use by plural respective participants. That is, the environment 300 provides a first set-up 302 for participant $P_1$, a second set-up 304 for participant $P_2$, a third set-up 306 for participant $P_3$, and an nth set-up 308 for participant $P_n$. Each set-up is located in a different geographical location. FIG. 2 shows the illustrative composition of the first set-up 302. The other set-ups (304, 306, . . . 308) may have an identical composition and manner of operation, although not expressly shown in FIG. 3.

The set-up 302 includes image capture functionality 310 for producing a representation of the participant $P_1$. In one case, the image capture functionality 310 includes one or more cameras of any type or types. For example, the image capture functionality 310 can include one or more cameras that produce information that can be used to construct a depth image of the real space of set-up 302, including the participant $P_1$ and any physical objects in the real space. A depth image defines the distance between a reference point (e.g., the location of a camera) and each position in the real space. The set-up 302 can use any technique to produce a depth image, such as a structured light technique, a time-of-flight technique, a stereoscopic technique, and so on, or any combination thereof.

For example, the set-up 302 can use the Kinect™ device provided by Microsoft Corporation of Redmond, Wash., to produce a depth image of the real space. In one implementation, the Kinect™ device uses a structured light technique to produce its depth images. In this approach, the image capture functionality 310 projects a light having a pattern onto the real space (that light constituting "structured light"). The structured light impinges the objects in the real space. The objects have three-dimensional surfaces having various shapes which distort the pattern of the structured light. The image capture functionality 310 then captures an image of the objects in the real space, as illuminated by the structured light. Depth determination functionality then compares the captured image with a reference image associated with the undistorted pattern. The depth determination functionality uses the result of this comparison to infer the distances between a reference point and each point in the real space.

In addition, or alternatively, the image capture functionality 310 can include one or more video cameras that produce video image information that represents the real space. That is, the video image information may provide a color (e.g., an RGB) representation of the objects in the real space.

In general, the image capture functionality 310 is said herein to generate "local camera information." The local camera information may include any raw information provided by image capture functionality 310, e.g., including information that is used to construct depth images and/or video image information, etc.

A local processing system 312 receives the local camera information from the local image capture functionality 310. The local processing system 312 also receives remote input information from each remote set-up (304, 306, . . . 308). The remote input information may include any information regarding objects that are present in the remote set-ups (304, 306, 308). For instance, that information can include remote camera information and/or three-dimensional (3D) object information. As will be explained below, the 3D object information for a set-up corresponds to a three-dimensional representation of objects in the real space of the set-up, produced based on the camera information provided by the set-up.

The local processing system 312 also forwards local input information to each of the remote set-ups (304, 306, . . . 308). The local input information is the counterpart of an instance of remote input information. That is, the local input information may provide any information regarding objects in the local set-up 302, e.g., including the raw local camera information and/or local 3D object information produced by the local processing system 312. The local 3D object information provides a three-dimensional representation of objects in the local real space of the set-up 302.

Figure 5:
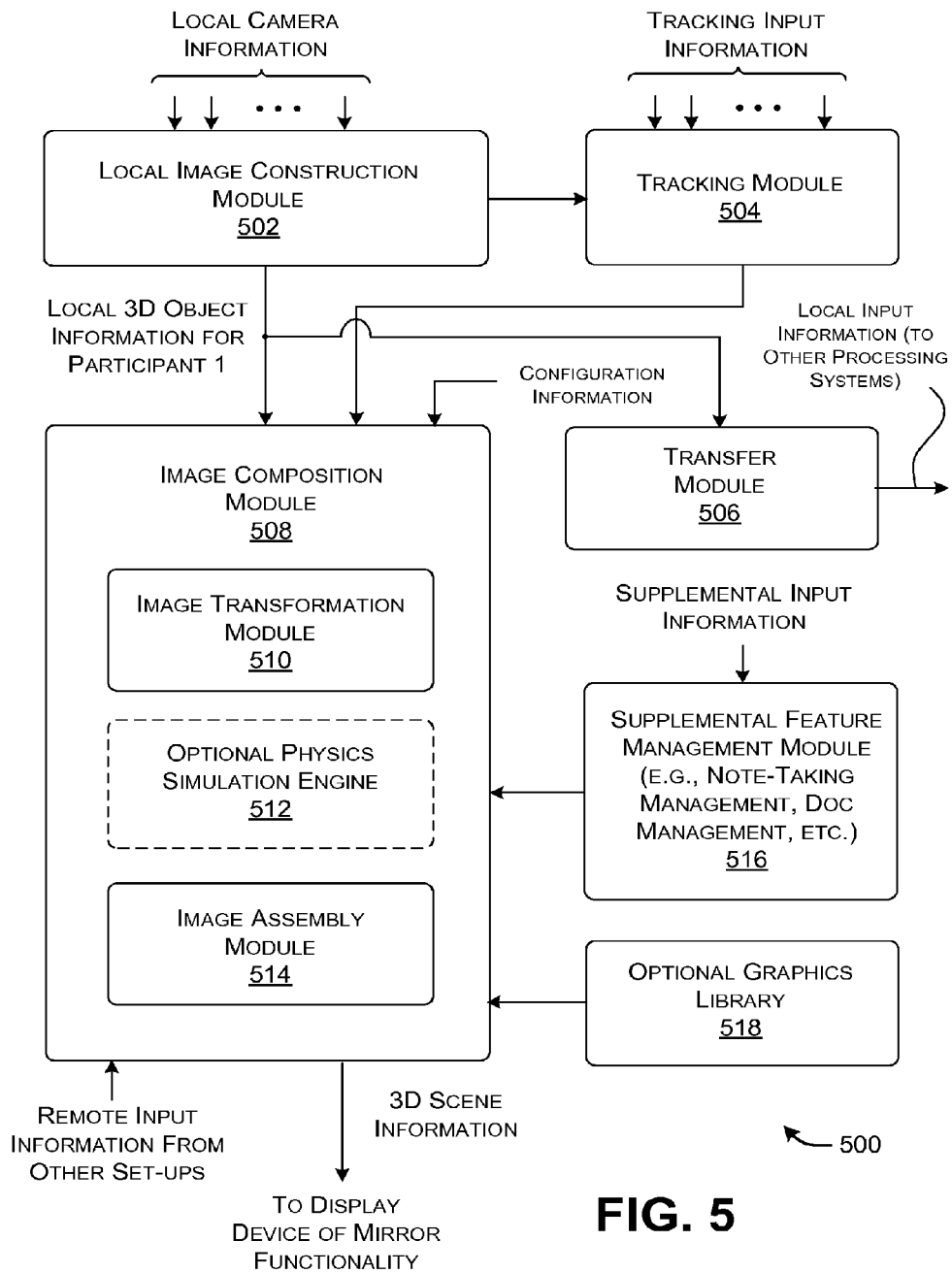
FIG. 5 shows one implementation of a local processing system that can be used to provide three-dimensional (3D) scene information. The mirror functionality of FIG. 3 or 4 display the 3D scene information.

The local processing system 312 generates 3D scene information based on the local camera information and the remote input information. FIG. 5 (to be described below) depicts one way in which the local processing system 312 may perform this task. By way of overview, the local processing system 312 can first create a three-dimensional representation of the real space associated with the local set-up 302, based on the local camera information. This yields local 3D object information for the local set-up 302, in the terminology introduced above. The local processing system 312 can then combine the local 3D object information for the local set-up 302 with the counterpart instances of 3D object information for the remote set-ups (304, 306, . . . 308). More specifically, this combination projects the separate instances into a common perspective (and coordinate system) that conforms to the mirror metaphor described with respect to FIGS. 1 and 2. The local processing system 312 can also integrate supplemental information into the 3D scene information that it creates, such as notes created by any participant, documents posted by any participant, control features, and so on. The local processing system 312 then sends the resultant 3D scene information to mirror functionality 314.

In the first implementation shown in FIG. 3, the mirror functionality 314 includes a physical semi-transparent mirror 316 that is positioned in front of a display device 318 (that is, "front" with respect to the location of the participant $P_1$). The semi-transparent mirror 316 presents a reflection of any object that is located in front of the semi-transparent mirror 316. At the same time, the semi-transparent mirror 316 will allow the participant $P_1$ to see any objects (real or virtual) that are placed in back of the semi-transparent mirror 316.

The display device 318 receives the 3D scene information provided by the local processing system 312. Based on that information, the display device displays a three-dimensional virtual space that is populated by one or more virtual images. The display device 318 can be implemented using any display technology, such as an LCD display. In another implementation, the display device 318 may be implemented as a stereo display device, or as a three-dimensional projection device which casts stereo information onto any surface (such as a wall). The participant $P_1$ may view the output of such a stereo display uses shutter glasses or the like; this gives the impression that objects in the virtual space have a depth dimension.

More specifically, the semi-transparent mirror 316 presents a virtual image 320 of the participant $P_1$, e.g., as an ordinary reflection on the mirror's surface. The display device 318 presents a virtual image 322 of a participant $P_2$ and a virtual object 324. The virtual object 324, for example, may correspond to the virtual ball 226 in FIG. 2. The first participant $P_1$ will perceive a composite virtual scene 326 upon viewing the mirror functionality 314, in which the first participant $P_1$ appears to be standing next the second participant $P_2$. The first participant $P_1$ will furthermore perceive himself or herself to be manipulating the virtual object 324 in his or her hand.

The set-up 302 produces the above-described effect by displaying the virtual images on the display device 318 at appropriate locations relative to reflections on the surface of the semi-transparent mirror 316. For example, the set-up 302 can determine the location of the virtual image 320 of the participant $P_1$ on the semi-transparent mirror 316 in order to place the virtual object 324 in the first participant's hand. This manner of operation presupposes that the set-up 302 knows the location of physical entities in real space, and the corresponding positions of virtual images on the surface of the semi-transparent mirror 316. The set-up 302 can gain this knowledge in different ways. In one case, the participant $P_1$ may be requested to confine his or her movement to a pre-determined region in the real space of the set-up 302. In this case, the set-up 302 can make a rough assumption that the virtual image 320 will appear at a predetermined location on the surface of the semi-transparent mirror 316. In another implementation, the set-up 302 can include tracking functionality that tracks the location of the participant $P_1$ in the real space of the set-up 302 with any level of granularity, e.g., by tracking the hands of the participant $P_1$ or the entire body of the participant $P_1$. The set-up 302 can determine the location of the virtual image 320 on the surface of the semi-transparent mirror 316 based on the tracking information. Still other techniques can be used to determine the location of the physical entities in real space, and their counterpart virtual images on the surface of the semi-transparent mirror 316.

The set-up 302 can also produce virtual images for presentation on the display device 318 that are scaled in conformance with the sizes of images that appear on the surface of the semi-transparent mirror 316. In one case, a distance of $d_1$ separates the participant $P_1$ from the semi-transparent mirror 316, and a distance of $d_2$ separates the semi-transparent mirror 316 from the display device 318. The participant $P_1$ will perceive his reflected virtual image 320 as occurring at a depth of $2 \times d_1$. The set-up 302 can present the virtual image 322 of the second participant $P_2$ such that it appears to have the same size as the virtual image 320 of the first participant $P_1$, from the vantage point of the real first participant $P_1$. In one case, the set-up 302 can achieve this result by making $d_1$ approximately equal to $d_2$. Without limitation, for instance, both $d_1$ and $d_2$ may be approximately equal to 3 feet.

The configuration of the mirror functionality 314 can be modified in various ways. For example, in another implementation, the display device 318 may be placed flush against the back of the semi-transparent mirror 316. The set-up 302 can change the manner in which it scales virtual images for presentation on the display device 318 to conform to this alternative arrangement.

Any type of communication mechanism 328 can couple the set-ups (302, 304, 306, . . . 308) together, such as a wide area network (e.g., the Internet), a local area network, point-to-point connections, etc., or combination thereof.

Figure 4:
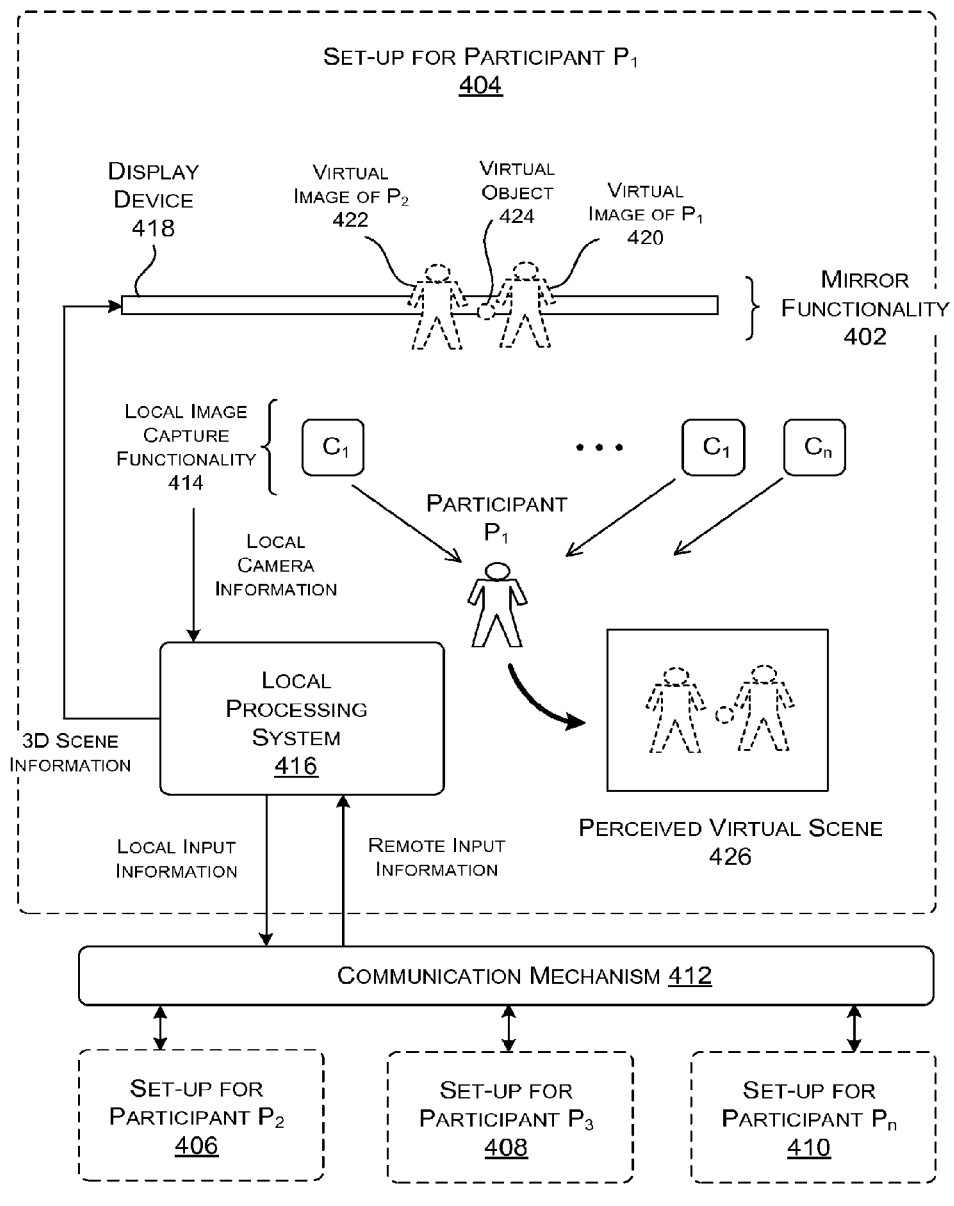
FIG. 4 shows a second implementation of an environment that can produce the experience illustrated in FIG. 2. This implementation provides mirror functionality that uses a display device alone, e.g., without a physical semi-transparent mirror.

FIG. 4 shows another environment 400 that can implement the tele-immersive experience described above. The environment 400 has the same components as the environment 300 of FIG. 3, with the exception that the mirror functionality 402 of FIG. 4 differs from the mirror functionality 314 of FIG. 3.

In summary, FIG. 4 shows a local set-up 404 for use by a first participant $P_1$. The local set-up 404 is coupled to other set-ups (406, 408, . . . 410) via a communication mechanism 412. Remote participants interact with the respective other set-ups (406, 408, . . . 410). FIG. 4 shows the illustrative composition of the local set-up 404; other set-ups (406, 408, . . . 410) have a similar composition and manner of operation, although not expressly shown in FIG. 4.

The set-up 404 includes image capture functionality 414 for producing local camera information. As explained above, the local camera information may include information that can be used to construct a depth image of the real space of the set-up 404. In addition, or alternatively, the local camera information can include video image information. A local processing system 416 receives the local camera information from the local image capture functionality 414, together with an instance of remote input information from each remote set-up (406, 408, . . . 410). Based on this input information, the local processing system 416 generates 3D scene information which it presents on the mirror functionality 402.

In this embodiment, the mirror functionality 402 includes a display device 418, without the use of a semi-transparent mirror. The display device 418 displays all aspects of the virtual space that is presented to the first participant $P_1$. That is, the display device 418 presents a virtual image 420 that is the virtual counterpart of the first participant $P_1$, and a virtual image 422 that is the virtual counterpart of the second participant $P_2$. The display device 418 also presents the virtual object 424. This collection of virtual images creates a perceived virtual scene 426; in that virtual scene 426, the second participant $P_2$ appears to be standing next to the first participant $P_1$, and the first participant $P_1$ appears to be manipulating the virtual object 424 in his hand.

In the implementation of FIG. 4, the "surface" of the mirror functionality 402 corresponds to the surface of the display device 418. By contrast, in the implementation of FIG. 3, the "surface" of the mirror functionality 314 corresponds to the surface of the semi-transparent mirror 316.

The local processing system 416 can compose the 3D scene information by assembling, projecting, and scaling the various instances of 3D object information provided by the various set-ups. The local processing system 416 can also take tracking information into account when producing the 3D scene information. For example, the local processing system 416 may rely on tracking information to determine the location of a participant's hands as that participant manipulates a virtual object.

Although not expressly depicted in either FIG. 3 or 4, each local set-up can also include a speaker for presenting sounds produced in each remote set-up, such as the voices of the remote participants. Each local set-up can also include a microphone for detecting sounds produced in the local set-up, such as the local participant's voice. Each local set-up can forward audio information produced by its microphone to the other remote set-ups, e.g., as part of the above-described local input information that it forwards to the remote set-ups.

FIG. 5 shows one implementation of a local processing system 500 that can be used to provide three-dimensional (3D) scene information in FIG. 3 or 4. That is, in one interpretation, the local processing system 500 corresponds to the local processing system 312 shown in FIG. 3. In another interpretation, the local processing system 500 corresponds to the local processing system 416 shown in FIG. 4. While the local processing system 312 may differ from the local processing system 416 in some regards, FIG. 5 focuses mainly on the commonality in functionality between these two implementations.

A local image construction module 502 receives the local camera information from the set-up's local camera functionality (310 or 414). The local image construction module 502 then forms 3D object information based on the local camera information. As a first step, the local image construction module 502 may transform each instance of camera information into a single coordinate space. That is, a set-up may provide multiple cameras at different locations around the local participant to capture a representation of the participant from different vantage points. Each camera produces a separate instance of camera information. The local image construction module 502 may merge the different instances of camera information into a single composite representation of the objects in real space, e.g., by applying appropriate coordinate transformations to each instance of camera information.

The local image construction module 502 can then process depth information provided by the integrated camera information to produce the local 3D object information. Without limitation, in one representative approach, the local image construction module 502 may use the depth information to create 3D meshes of the objects in the real space of the set-up. Each 3D mesh may be likened to a wireframe model of an object in real space, e.g., composed of a plurality of triangles defined by vertices in the depth information. The local image construction module 502 can then apply the video information to the 3D meshes. That is, in one implementation, the local image construction module 502 treats the video information as textures that can be "pasted" on the 3D meshes in the manner of skin onto bodies.

A tracking module 504 can track the position of various objects in the real space associated with a set-up. The tracking module 504 can use one or more techniques to perform this task. In one case, the tracking module 504 uses the above-described Kinect™ device to represent each participant's body as a skeleton, that is, as a collection of joints connected together by line segments. The tracking module 504 can then track the movement of the joints of this skeleton as the participant moves within the real space. Alternatively, or in addition, the tracking module 504 can use any head movement technology to track the movement of the participant's head. Alternatively, or in addition, the tracking module 504 may use any eye gaze recognition technology to track the participant's eye gaze.

In the above examples, the tracking module 504 tracks the movements of objects in the real space based on the local camera information described above. Alternatively, or in addition, the tracking module 504 can collect supplemental information that reveals the positions of objects in the real space. For example, consider the scenario shown in FIG. 2 in which the rectangular object 216 that the first participant 202 moves within the real space 204 corresponds to a smartphone or the like. A smartphones typically includes one or more position-determination devices, such as a gyroscope and/or an accelerometer. These devices provide position information which indicates the relative location of the smartphone. The tracking module 504 can receive position information from these devices and combine it with the position information provided by a skeletal tracking system. The resultant position information can define the location of the participant's hand (which holds the rectangular object 216) with an improved degree of accuracy, compared to using position data provided by the skeletal tracking system alone.

Alternatively, or in addition, supplemental tags can be affixed to objects in the real space of a set-up. For example RF tags may be attached to the hands and head of the participant, and to each physical object in the real space. The tracking module 504 can receive supplemental position information that is obtained from these tags.

The above tracking technologies are cited by way of example, not limitation. Other implementations can use other techniques for determining the positions of bodies and other objects in real space. Further note that the local processing system 500 can make use of tracking information to varying extents, e.g., depending on the implementation of the local processing system 500 and depending on a mode in which the local processing system 500 is being used. In some cases, the local processing system 500 may make no use of the tracking information, or minimal use of the tracking information.

For example, assume that the local processing system 500 is used in the environment 400 of FIG. 4, and the objective is merely to present images of the participants in side-by-side relationship to each other in virtual space. Further, assume that each participant is expected to be present in a predetermined region in the real space of his or her set-up. The local processing system 500 can produce the desired virtual space without, for instance, performing precise tracking of each participant's hands.

A transfer module 506 forwards the local input information to the other remote participants of the tele-immersive session. As explained above, the local input information may correspond to the raw camera information provided by the local set-up and/or the processed local 3D object information provided by the local image construction module 502, for instance. The transfer module 506 can use any technique for transferring the local input information, such as a multiplexing technique in which the transfer module 506 broadcasts the local input information to different destinations associated with the remote set-ups.

An image composition module 508 receives the 3D object information from the image construction module 502, as well as instances of remote 3D object information from the various remote set-ups. Based on this information, the image composition module 508 produces the 3D scene information for output to the display device (318 or 418) of the mirror functionality (314 or 402).

The image composition module 508 may include (or may be conceptualized to include) plural sub-modules that perform different respective functions. An image transformation module 510 transforms each instance of 3D object information into a common coordinate space associated with the metaphorical mirror that is being modeled. The image transformation module 510 can also apply appropriate scaling to the various instances of 3D object information. An optional physics simulation engine 512 can apply simulation effects to any virtual object in the virtual scene, such as the virtual ball 226 described in connection with FIG. 2. An image assembly module 514 can assemble the various different parts of a scene into integrated 3D scene information.

The physics simulation engine 512 can rely, at least in part, on known simulation algorithms to manipulate 3D virtual objects in realistic or nonrealistic ways, including models that take into account rigid body dynamics, soft body dynamics, etc. Illustrative known physics simulators include PhysX, provided by Nvidia Corporation of Santa Clara, Calif.; Havok Physics, provided by Havok of Dublin Ireland; Newton Game Dynamics, produced by Julio Jerez and Alain Suero, and so on.

A supplemental feature management module 516 ("management module" for brevity) contributes supplemental information that may be added to the 3D scene information. For example, the management module 516 can receive writing information from the mirror functionality (314, 402) that indicates that the local participant has written on the surface of the mirror functionality (314, 402). The management module 516 may then forward the writing information to the image composition module 508, where it can be integrated into the 3D scene that is being created. As noted in Section A, any participant may also interact with a note that has been added to the virtual space in any manner. The management module 516 can also manage this interaction.

More specifically, in the case of FIG. 4, the display device 418 may include a touch sensitive surface. The display device 418 may produce writing information when a participant interacts with the touch sensitive surface, e.g., using a stylus, finger, or some other implement. Alternatively, or in addition, a camera can be placed in front of and/or behind the display device 418 to detect the local participant's interaction with the display device 418, and to produce writing information as a result. Similarly, in the case of FIG. 3, the semi-transparent mirror 316 can include a touch sensitive surface which produces writing information when a participant makes contact with that surface. Alternatively, or in addition, a camera can be placed in front of and/or behind the semi-transparent mirror 316 to detect the local participant's interaction with the semi-transparent mirror 316, and produce writing information as a result. Or the set-up 302 of FIG. 3 can provide a separate transparent member (not shown) in front of the semi-transparent mirror 316 on which the local participant can write, and the set-up 302 can produce writing information as a result. Alternatively, or in addition, the local participant can use any other input mechanism(s) to provide notes, such as, but are not limited to, a keypad, a mouse device, a voice recognition mechanism, and so on.

The management module 516 can also manage the retrieval and manipulation of documents. For example, the management module 516 can receive a command from the local participant using any input mechanism. The management module 516 can then retrieve a document that is specified by the command, e.g., by retrieving a spreadsheet document for a file named "tax return 2012" when the local participant speaks the voice command "retrieve tax return 2012," or when the local participant inputs this command through any other input mechanism. The environment can then allow any participant of the tele-immersive session to manipulate the document in any manner described above in Section A.

The management module 516 can also display any kind of control feature in the virtual space, such as the representative control feature 234 shown in FIG. 2. The management module 516 can also detect the local participant's interaction with the control feature, and then take appropriate action(s) based on the participant's interaction.

The management functions described above are cited by way of example, not limitation. The management module 516 can perform yet other functions in other implementations.

The image composition module 508 may also receive graphics information from an optional graphics library 518. For example, the graphics library 518 may contain instances of 3D object information associated with various stock objects, such as the virtual ball 226 shown in FIG. 2. In operation, the image composition module 508 can determine whether the 3D scene that is being created will include any virtual objects described by the graphics library 518. If so, the image composition module 508 retrieves the appropriate instance of 3D object information from the graphics library 518 and integrates it into the scene that is being created.

FIG. 5 also indicates that the image composition module 508 receives various configuration instructions the local participant. For example, the local participant may specify whether or not the mirror functionality 402 of FIG. 4 will display a virtual image (e.g., a virtual reflection) of himself on the display device 418. If the participant specifies "no," the resultant virtual space will omit a virtual representation of the local participant. But the other participants will nonetheless still see the virtual image of the local participant. The local participant can provide any other configuration instructions, such as by adjusting the volume of the remote participants' voices, specifying the order in which the participants will appear in the virtual space, and so on.

C. Illustrative Variations and Extensions

This Section provides details regarding various modifications and extensions of the concepts and functionality set forth in Sections A and B.

Figure 6:
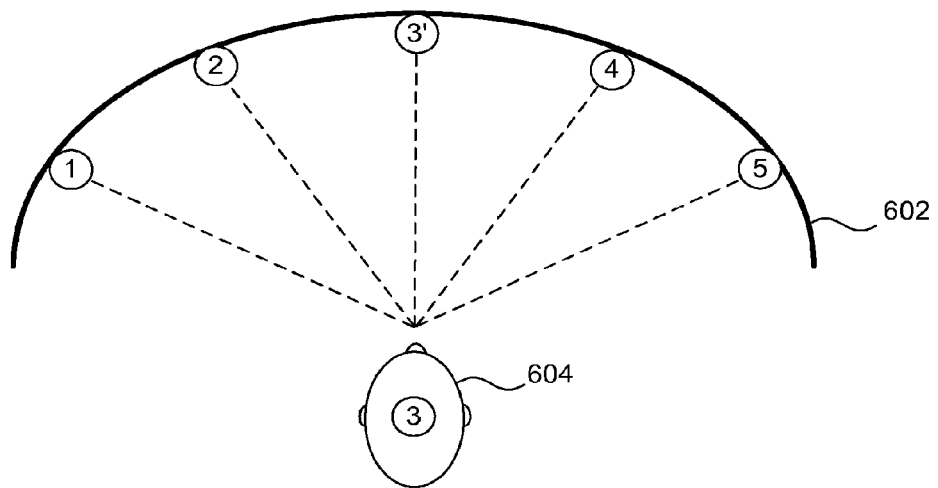
FIG. 6 shows mirror functionality that uses a display device having a curved display surface.

FIG. 6 shows a first variation of the concepts set forth in FIGS. 1-5. That is, in the examples of FIGS. 3 and 4, the mirror functionality (314, 402) uses a display device (318, 418) having a planar display surface. In contrast, FIG. 6, shows mirror functionality having a display device 602 with a curved display surface. For example, the display device 602 may have a semicircle-shaped surface, a parabolic surface, etc. The local participant 604 may observe the content presented on the display device 602 from a vantage point that lies at or near the center of the curved surface of the display device 602. More specifically, the local processing system of the participant's set-up can continue to compute the 3D scene information as if the users were standing next to each other in front of a planar mirror. But, in the implementation of FIG. 6, the local processing system presents this 3D scene information on the display device 602 having a curved surface. The 3D scene information may optionally include or omit a virtual image of the local participant.

The arrangement of FIG. 6 gives the local participant 604 the impression that the remote participants are arrayed around him, as if he is seated near the center of a circular table. The local participant 604 may find this manner of presentation helpful in those scenarios in which there are a large number of participants; that is, this configuration may allow the local participant 604 to more effectively observe the remote participants, compared to a linear arrangement. Further, the local participant 604 may rotate his or her head (or his or her entire body) to talk to different participants. This rotation may be more pronounced compared to the case in which the remote participants are linearly-arranged in front of the local participant 604. This aspect may improve interaction by more effectively revealing the direction of attention of the local participant 604 to the remote participant(s).

Figure 7:
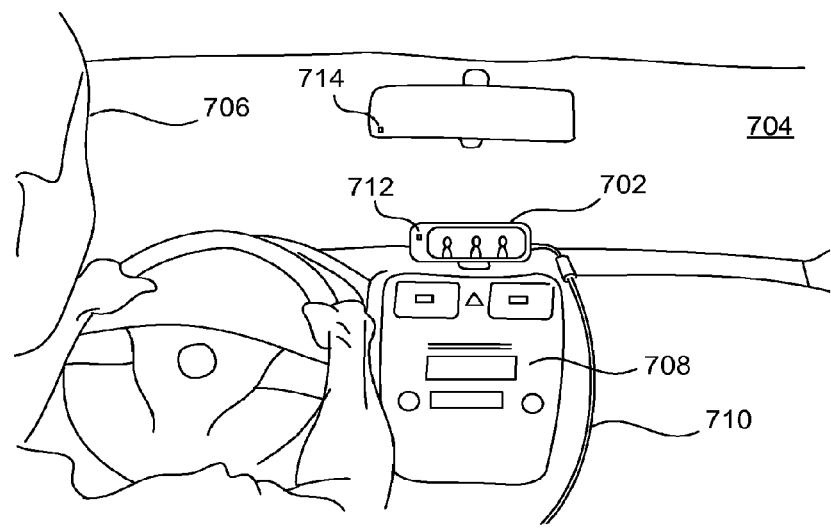
FIG. 7 shows mirror functionality that uses a portable display device.

FIG. 7 shows another variation of the concepts sets forth in FIGS. 1-5. That is, in the examples of FIGS. 3 and 4, the mirror functionality (314, 402) uses a relatively large display device (318, 418). For example, the display device (318, 418) may be large enough to display a life-sized virtual image of each participant of the tele-immersive session. But the display device of the mirror functionality can have any size, and the virtual images of the participants can be scaled in any manner. For example, FIG. 7 shows mirror functionality that uses a portable (e.g., handheld) display device 702 to display virtual images of the participants of the tele-immersive session. The display device 702 shows a scaled-down version of each participant using the same mirror metaphor described above. The display device 702 may correspond, for example, to any of a smartphone, an electronic book reader device, a portable game device, a tablet computing device, a personal digital assistant device, a laptop computing device, a netbook-type computing device, and so on.

The display device 702 can provide a tele-immersive experience in any environment, including dynamic environments in which one or more of the participants are moving. FIG. 7, for instance, shows the illustrative use of the display device 702 in the interior of a vehicle 704. A local participant 706 may correspond to the driver of the vehicle 704. The driver may mount the display device 702 on the dashboard of the vehicle 704, e.g., above a control panel 708. The display device 702 may receive power from the vehicle 704 via a conventional power cord 710 and/or its own internal battery source. The interior of the vehicle 704 may also include image capture functionality, e.g., by providing one or more cameras located at various locations within the interior. The display device 702 may provide one such camera 712. A rear view mirror may provide another camera 714. The image capture functionality provides a representation of the local participant 706 in the manner described above, e.g., by providing information that can be used to produce a depth image of the interior of the vehicle, together with video image information.

In one case, any remote participant of the tele-immersive session can be located in another vehicle, or in his or her home or office, or in any other locale. In another case, at least some of the "remote" participants may be located in the vehicle 704 itself, e.g., in the back seat of the vehicle 704. The local participant 706 may find it useful to converse with the backseat participants via the display device 702, rather than swivel his head to talk to the participants in the back seat. Where the laws of the local jurisdiction permit, the local participant 706 can use the above-described technique to engage in a tele-immersive session while driving; if the rules do not permit this kind of behavior, the local participant 706 can conduct the session while the vehicle is not moving. In other scenarios, the local participant 706 can detach the display device 702 from its mount and continue the tele-immersive session while walking, or in any other locale.

As a clarifying closing remark, FIGS. 3-5 provide an example in which all of the processing provided by the local processing system (312, 416, 500) is performed at the local set-up. Alternatively, at least some parts of this processing can be delegated to remote processing functionality, such as remote cloud computing functionality. This implementation may be particularly useful in the mobile scenario described above, e.g., in those cases in which the display device 702 may have limited processing capabilities.

Figure 8:
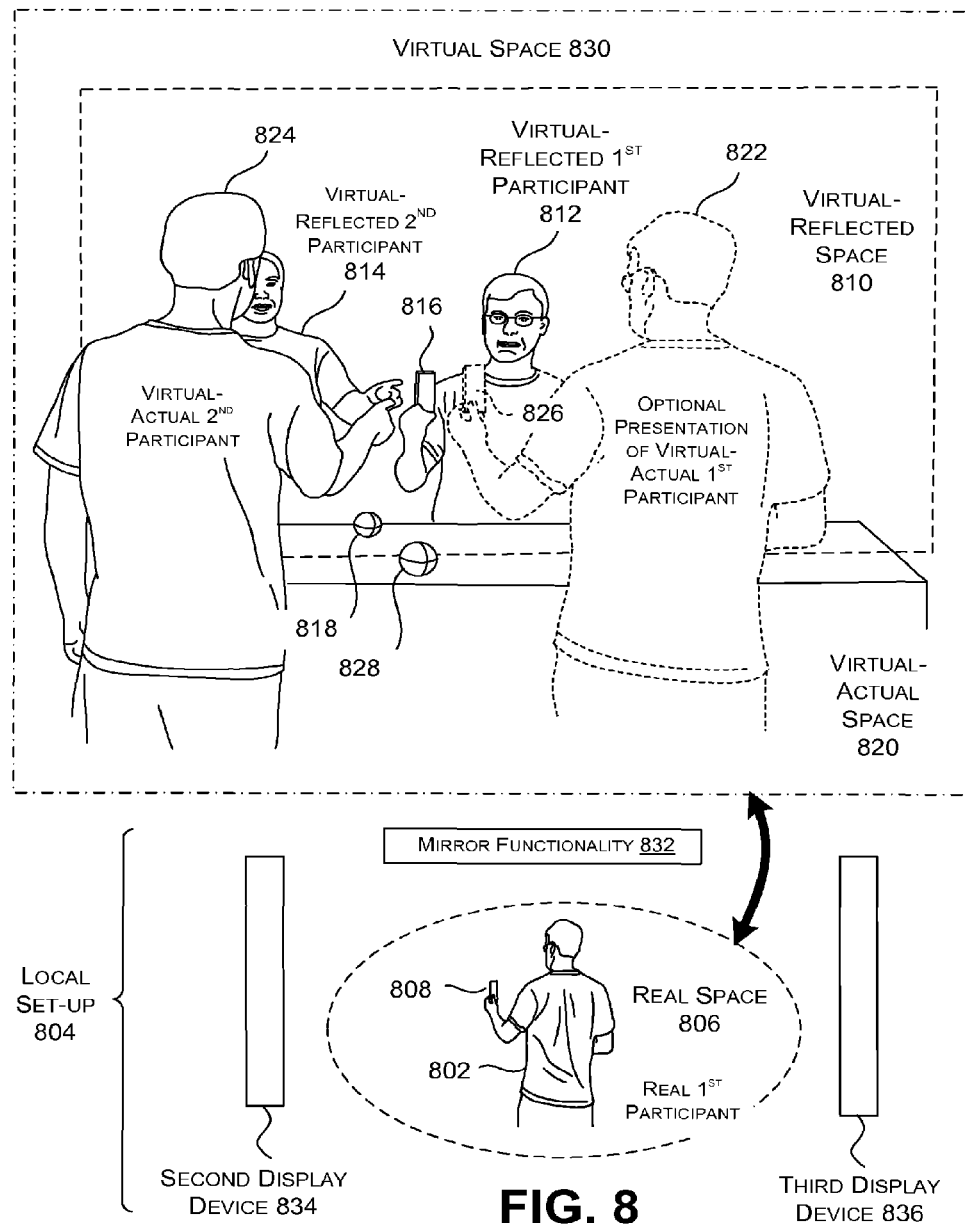
FIG. 8 shows a tele-immersive experience that involves presenting a virtual space that is composed of a virtual-reflected space and a virtual-actual space.

FIG. 8 shows another variation of the concepts sets forth in FIG. 1-5. More specifically, in the examples of FIGS. 1 and 2, the environment 100 creates a virtual space 108 that includes reflected virtual images 110. That is, the virtual images 110 in the virtual space 108 correspond to reflections, produced by the mirror functionality 106, of the real entities in the real space 104. In another implementation, the virtual space 108 can be extended to present virtual representations of both the real entities in the real space 104 and the reflections produced by the mirror functionality 106. The virtual representations of the real entities are referred to herein as virtual-actual entities, e.g., virtual-actual participants, virtual-actual objects, etc. The virtual representations of the reflections are referred to as virtual-reflected entities, e.g., virtual-reflected participants, virtual-reflected objects, etc. Each entity shown in the virtual space 206 of FIG. 2 constitutes a virtual-reflected participant or a virtual-reflected object, or a purely-virtual object. A purely-virtual object has no real counterpart in any of the real spaces of the environment 100, as is the case of the virtual ball 226.

In FIG. 8, a first participant 802 and a second participant engage in a tele-immersive session using a modified version of the environment 100. That is, the first participant 802 operates at a first location using a local set-up 804. That setting provides a real space 806 associated with the first participant 802. At the current time, the first participant 802 is holding a rectangular object 808 in his left hand, presenting it for inspection by the second participant. The second participant operates at a second location which is remote relative to the first location. The second participant uses a remote set-up (not shown). At the current time, the second participant is pointing to the rectangular object 808 being held by the first participant 802.

FIG. 8 depicts the tele-immersive experience from the perspective of the first participant 802. That is, the environment 100 offers a virtual-reflected space 810 that is similar to the virtual space 206 of FIG. 2. The virtual-reflected space 810 includes a virtual-reflected image 812 of the first participant 802, a virtual-reflected image 814 of the second participant, a virtual-reflected rectangular object 816 that corresponds to the rectangular object 808, and a virtual-reflected ball 818 that corresponds to a real ball (not shown) that the first participant 802 places on a workspace table.

In addition, the environment 100 can create a virtual-actual space 820 that represents entities that stand before the metaphorical mirror (where, in contrast, the virtual-reflected space 810 corresponds to reflections that appear in the metaphorical mirror). The virtual-actual space 820 includes an optional virtual-actual image 822 of the first participant 802, a virtual-actual image 824 of the second participant, a virtual-actual rectangular object 826 corresponding to the real rectangular object 808, and a virtual-actual ball 828 corresponding to the real ball (not shown) that the first participant 802 places on the workspace table. In another configuration, the environment 100 can omit the virtual-actual image 822 associated with the first participant 802. Further, note that the various virtual-actual images correspond to complete versions of the real entities in the real spaces. But the environment 100 can also display virtual-actual images that represent partial representations of the real entities, such as by showing only those portions of the real entities that lie within a prescribed distance from the metaphorical mirror, such as by showing only the arms and hands of the first and second participants in this example.

Considered as a whole, the environment 100 offers a virtual space 830 that is made up of the virtual-actual space 820 and the virtual-reflected space 810. This virtual space 830 may offer an enhanced feeling of immersion to the local first participant 802 compared to the examples of Section A. For example, as in the examples of Section A, the first participant 802 can observe the actions of the second participant by watching the movement of the second participant's virtual-reflected image 814. In addition, or alternatively, the implementation of FIG. 8 allows the first participant 802 to observe the actions of the second participant by watching the movement of the virtual-actual image 824. That is, the first participant 802 can turn his head to the left slightly to observe how the second participant is behaving in front of the mirror, and/or by looking at the metaphorical mirror itself.

The workspace table in FIG. 8 can assemble all of the objects that are placed on the real workspace tables in all of the real set-ups. That is, the virtual-reflected space 810 includes a representation of these objects as they appear on the surface of the metaphorical mirror. The virtual-actual space 820 includes a direct representation of these objects, as they are placed on the physical workspace tables.

Further note that any participant can interact with a virtual object in any space. For example, as in the examples of Section A, a participant can continue to interact with a virtual-reflected object that appears in the virtual-reflected space 810. In addition, or alternatively, using the implementation of FIG. 8, a participant can interact with a virtual-actual object that appears in the virtual-actual space 820. If a participant makes a change to one of these virtual spaces, the environment 100 can produce a corresponding change in the counterpart virtual space; for example, if the user moves a virtual-reflected ball in the virtual-reflected space 810, the environment 100 can make a corresponding movement of the corresponding virtual-actual ball in the virtual-actual space 820.

The added features of FIG. 8 can be implemented in various ways. In a first approach, the environment 100 can continue to provide the virtual-reflected space 810 in the manner described above, e.g., using the implementation shown in FIG. 3 or the implementation shown in FIG. 4. That is, the environment 100 can: (1) capture camera information; (2) transform the camera information into a collection of 3D objects; and (3) assemble the 3D objects into 3D scene information. This first instance of 3D scene information projects the 3D objects from the perspective of reflections in the metaphorical mirror.

The local set-up 804 (associated with the local first participant 802) can use mirror functionality 832 to present the first instance of 3D scene information. For example, the mirror functionality 832 can be implemented using the mirror functionality (314, 402) described in FIG. 3 or 4, or some other implementation. The surface of the mirror functionality 832 continues to define the surface of the metaphorical mirror.

In addition, the local set-up 804 can create a second instance of 3D scene information by casting the same 3D objects from another perspective—namely, the perspective of virtual entities within the virtual-actual space 820. In other words, this operation does not involve creating new 3D objects, but rather projecting the existing 3D objects from a new perspective to create another instance of 3D scene information.

The local set-up 804 can then project the second instance of the 3D scene information using one or more supplemental display devices. For example, a second display device 834 to the left of the first participant 802 can present a virtual representation of any participant(s) to the left of the first participant 802, e.g., by displaying the virtual-actual image 824. A third display device 836 to the right of the first participant 802 can present a virtual representation of any participant(s) to the right of the first participant 802 (where, in this case, there are no participants in this direction). The display devices (834, 836) may correspond to LCD display devices, stereo display devices, etc.

In another case, a stereo projector display device can be positioned above the first participant 802. That device can project a 3D scene in the area around the first participant 802, including the regions to his left and right. The first participant 802 can view the resultant 3D scene using shutter glasses or some other mechanism. Still other ways of presenting the virtual space 830 are possible.

The environment 100 can implement the manipulation of virtual objects in the manner described above. That is, the environment 100 can use any tracking technology(ies) to determine the positions of the objects in the real spaces of the environment 100. The environment 100 can use this knowledge to accurately determine when any participant is attempting to manipulate a virtual object in any manner.

In a second implementation, the environment 100 can use a single display device to present all aspects of the virtual space 830. In other words, this single display device presents the complete scene associated with the virtual space 830, including all entities associated with the virtual-reflected space 810 and all entities associated with the virtual-actual space 820. The single display device may correspond to an LCD display, a stereo display, a stereo projector, etc. The environment 100 can present this 3D scene from any perspective. For example, in the depiction of FIG. 8, the display device presents the 3D scene from a simulated camera position that lies in back of the virtual-actual participants. Further, the environment 100 may allow each local participant to dynamically select the vantage point from which the 3D scene is presented during a tele-immersion session, as well as the types of objects that are included in the 3D scene.

In this single-display implementation, each local participant acts as an "outside" observer of an immersive session in which he or she is one of the participants. The single display device may depict the surface of the metaphorical mirror. But the surface of the display device itself may no longer correspond to the surface of that metaphorical mirror. This is in contrast to the first-mentioned implementation, in which each participant observes the session from "within" the session, and in which the surface of the mirror functionality 832 defines the surface of the metaphorical mirror.

In a third implementation, the environment 100 can use the arrangement shown in FIG. 4 to present the images in the virtual-reflected space 810, e.g., using a single display device. In addition, that same display device can present at least parts of the images in the virtual-actual space 820. For example, consider the perspective of the actual first participant 802. He may see all the images in the virtual-reflected space 810. In addition, he may see at least the virtual-actual forearm (of the virtual-actual image 824) of the second participant (which is pointing at the virtual-reflected rectangular object 816), and the virtual-actual ball 828. In one optional configuration, he might also see his own virtual-actual forearm (which is part of the virtual-actual image 822), as well as the virtual-actual rectangular object 826. In other words, the display device captures the reflections as well as at least parts of the scene which appears in front of the mirror surface. The display device can be implemented in any manner described above, such as an LCD display, a stereo display, a stereo projector, etc. A stereo display mechanism can be particularly effective in this embodiment, as it can help the observer distinguish between objects which appear in front of the mirror surface and virtual-reflected objects.

Still other implementations of the concepts set forth with respect to FIG. 8 are possible.

D. Illustrative Processes

Figure 9:
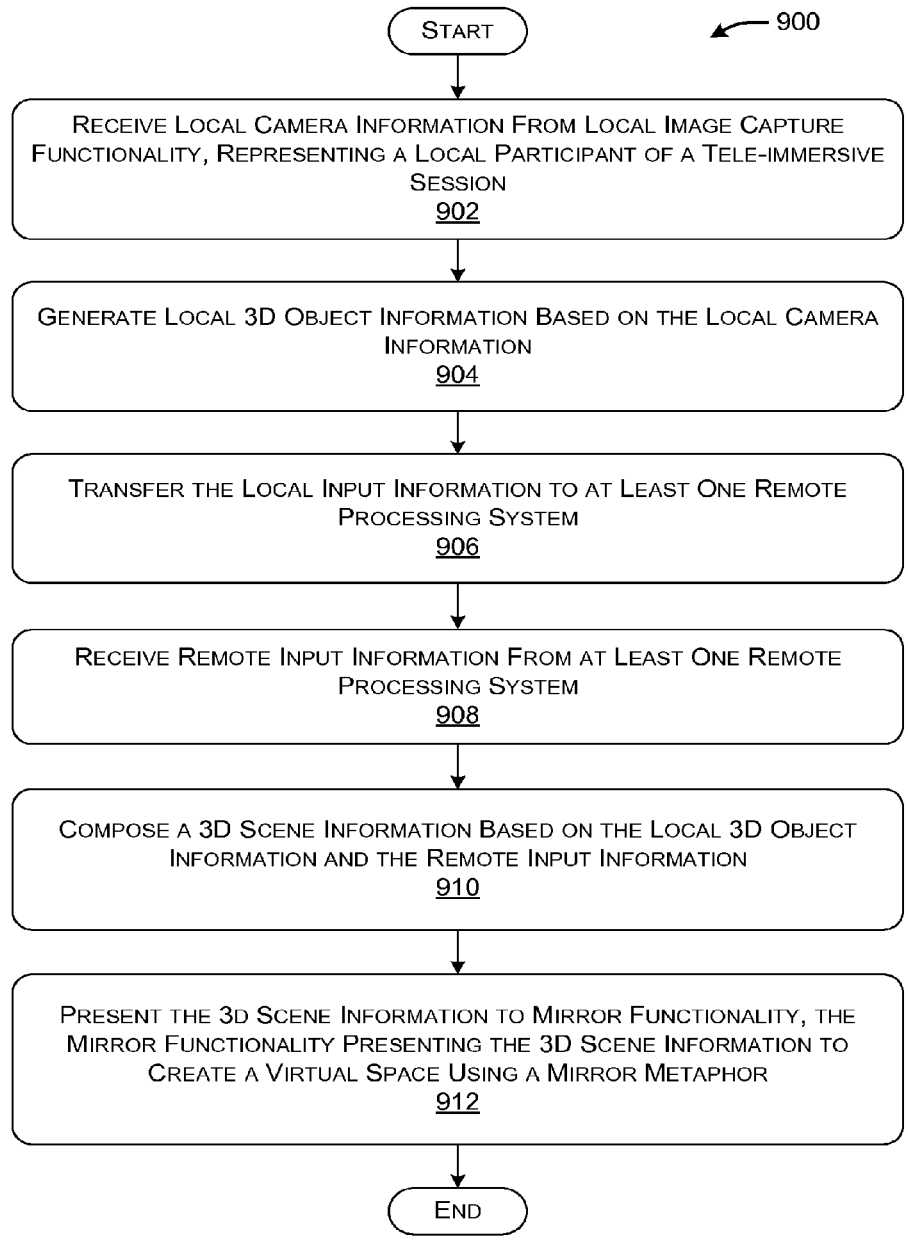
FIG. 9 shows an illustrative procedure that explains one manner of operation of a local processing system.

FIG. 9 shows a procedure 900 that explains one manner of operation of any of the environments described above from the "perspective" of the local processing system 500 of FIG. 5. Since the principles underlying the operation of the local processing system 500 have already been described in Section A, certain operations will be addressed in summary fashion in this section.

In block 902, the local processing system 500 receives local camera information from the local image capture functionality (310, 414). This information represents the appearance of a local participant of a tele-immersive session, and any other objects in the real space of the local set-up.

In block 904, the local processing system 500 generates 3D object information based on the local camera information. This operation may entail using depth information to produce a 3D mesh of each object in the real space of the local set-up, and then applying the video information as a texture onto the 3D mesh.

In block 906, the local processing system 500 transfers local input information to each of the remote processing systems provided by the respective remote set-ups. The local input information may include any information regarding objects identified by the local processing system 500, such as the raw local camera information (received in block 902) and/or the processed 3D object information (provided in block 904).

In block 908, the local processing system 500 receives remote input information from each remote processing system of each respective remote set-up. Similar to the local input information, the remote input information may correspond to any information regarding objects identified by remote processing systems, such as raw remote camera information and/or processed remote 3D object information.

In block 910, the local processing system 500 composes 3D scene information based on the local 3D object information and the remote input information. This composition operation may include projecting the separate 3D objects into a common coordinate space, and performing appropriate scaling on the various parts of the 3D scene. The composition operation may also include integrating supplementation information into the 3D scene, such as writing information, retrieved documents, control features, etc.

In block 912, the local processing system 500 provides the 3D scene information to the local mirror functionality, e.g., using either the mirror functionality 314 of FIG. 3 (which uses a physical semi-transparent mirror 316) or the mirror functionality 402 of FIG. 4 (which does not use a physical semi-transparent mirror). The mirror functionality (314, 402) creates a three-dimensional virtual space that shows at least some of the participants as if the participants were physically present at a same location and looking into a mirror.

In another implementation, block 910 can also entail generating another instance of 3D scene information that represents virtual-actual objects in the virtual-actual space 820 of FIG. 8. Block 912 can entail presenting this second instance of 3D scene information in any manner described in Section D.

E. Representative Computing Functionality

FIG. 10 sets forth illustrative computing functionality 1000 that can be used to implement any aspect of the functions described above. For example, the computing functionality 1000 can be used to implement any aspect of each local processing system 500 providing by each local set-up. In one case, the computing functionality 1000 may correspond to any type of computing device that includes one or more processing devices. In all cases, the computing functionality 1000 represents one or more physical and tangible processing mechanisms.

The computing functionality 1000 can include volatile and non-volatile memory, such as RAM 1002 and ROM 1004, as well as one or more processing devices 1006 (e.g., one or more CPUs, and/or one or more GPUs, etc.). The computing functionality 1000 also optionally includes various media devices 1008, such as a hard disk module, an optical disk module, and so forth. The computing functionality 1000 can perform various operations identified above when the processing device(s) 1006 executes instructions that are maintained by memory (e.g., RAM 1002, ROM 1004, or elsewhere).

More generally, instructions and other information can be stored on any computer readable medium 1010, including, but not limited to, static memory storage devices, magnetic storage devices, optical storage devices, and so on. The term computer readable medium also encompasses plural storage devices. In many cases, the computer readable medium 1010 represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 1000 also includes an input/output module 1012 for receiving various inputs (via input devices 1014), and for providing various outputs (via output devices). Illustrative input devices include a keyboard device, a mouse input device, a touchscreen input device, a gesture input device, a voice recognition mechanism, an image capture mechanism, a tracking mechanism, and so on. One particular output mechanism may include a presentation device 1016; that device, in turn, may correspond to a component of the above-described mirror functionality (314, 402). The computing functionality 1000 can also include one or more network interfaces 1020 for exchanging data with other devices (e.g., provided in other set-ups) via one or more communication conduits 1022. One or more communication buses 1024 communicatively couple the above-described components together.

The communication conduit(s) 1022 can be implemented in any manner, e.g., by a local area network, a wide area network (e.g., the Internet), etc., or any combination thereof. The communication conduit(s) 1022 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the description may have set forth various concepts in the context of illustrative challenges or problems. This manner of explanation does not constitute an admission that others have appreciated and/or articulated the challenges or problems in the manner specified herein. Further, the claimed subject matter is not limited to implementations that solve any or all of the noted challenges/problems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving local camera information that represents a local participant associated with a local system;
   receiving remote input information that represents at least one remote participant from at least one remote system operating in a geographical location that is different from the local system;
   composing scene information based at least in part on the local camera information and the remote input information;
   providing a presentation of a virtual space based at least in part on the scene information, the virtual space showing the local participant and the at least one remote participant as if the local participant and the at least one remote participant were physically present at a same location; and
   omitting a virtual image of the local participant from the virtual space in response to receiving an instruction from the local participant indicating not to display the virtual image of the local participant in the virtual space.

2. The method of claim 1, further comprising transferring local input information to the at least one remote system, the local input information corresponding to information associated with objects identified by the local system.

3. The method of claim 2, wherein the local input information comprises one or more of the local camera information or local three-dimensional object information that provides a three-dimensional representation of one or more objects in a real space that is local to the local system.

4. The method of claim 1, further comprising providing a functionality to enable the local participant to interact with a virtual object presented in the virtual space.

5. The method of claim 1, further comprising:
   tracking a location or movement of the local participant in a real space of the local system; and
   transferring the tracked location or movement of the local participant to the at least one remote system.

6. An apparatus comprising:
   a local processing system to:
      receive remote input information that represents a plurality of remote participants from a plurality of remote systems operating in one or more geographical locations different from each other; and
      compose scene information based at least in part on the remote input information; and
   a mirror functionality to present a virtual space based at least in part on the scene information, the virtual space showing the plurality of remote participants as if the plurality of remote participants were physically present at a same location without displaying a virtual image of a local participant associated with the local processing system.

7. The apparatus of claim 6, further comprising an image capture functionality to capture local camera information that represents the local participant.

8. The apparatus of claim 7, wherein the local processing system is further configured to generate local object information based at least in part on the local camera information, and wherein the local processing system composes the scene information based further on the local object information.

9. The apparatus of claim 8, wherein the virtual space further shows the local participant as if the local participant and the plurality of remote participants were physically present the same location in response to receiving an instruction from the local participant to display the virtual image of the local participant in the virtual space.

10. The apparatus of claim 6, wherein the local processing system is further configured to transfer local input information to at least one of the plurality of remote systems, the local input information corresponding to information associated with one or more objects identified by the local processing system.

11. The apparatus of claim 6, wherein the mirror functionality causes a display device to receive the scene information and present respective virtual images of the plurality of remote participants.

12. The apparatus of claim 6, wherein the local processing system includes functionality that enables the local participant to interact with one or more virtual-reflected objects and one or more virtual-actual objects, a virtual-reflected object of the one or more virtual-reflected objects corresponding to an object projected from a perspective of reflections on a mirror surface and a virtual-actual object of the one or more virtual-actual objects corresponding to an object projected from a perspective of an entity that is placed before the mirror surface.

13. The apparatus of claim 6, further comprising a management module that receives information specified by the local participant and provides participant-specified information, wherein the local processing system is further configured to present the participant-specified information using the mirror functionality.

14. The apparatus of claim 6, further comprising a management module that provides a control feature and manages one or more interactions with the control feature, wherein the local processing system is further configured to present the control feature using the mirror functionality.

15. A local system comprising:
an image capture functionality to receive local camera information that represents a local participant associated with the local system;
a local processing system to:
receive remote input information that represents at least one remote participant from at least one remote system operating in a geographical location that is different from the local system; and
compose scene information based at least in part on the local camera information and the remote input information; and
a mirror functionality to:
provide a presentation of a virtual space based at least in part on the scene information, the virtual space showing the local participant and the at least one remote participant as if the local participant and the at least one remote participant were physically present at a same location; and
omit a virtual image of the local participant from the virtual space based on an instruction from the local participant indicating not to display the virtual image of the local participant in the virtual space.

16. The local system of claim 15, wherein the local processing system is further configured to transfer local input information to the at least one remote system, the local input information corresponding to information associated with one or more objects identified by the local processing system.

17. The local system of claim 15, wherein the local processing system includes functionality that enables the local participant to interact with one or more virtual-reflected objects and one or more virtual-actual objects, a virtual-reflected object of the one or more virtual-reflected objects corresponding to an object projected from a perspective of reflections on a mirror surface and a virtual-actual object of the one or more virtual-actual objects corresponding to an object projected from a perspective of an entity that is placed before the mirror surface.

18. The local system of claim 15, further comprising a management module that receives information specified by the local participant and provides participant-specified information, wherein the local processing system is further configured to present the participant-specified information using the mirror functionality.

19. The local system of claim 15, further comprising a management module that provides a control feature and manages one or more interactions with the control feature, wherein the local processing system is further configured to present the control feature using the mirror functionality.

* * * * *